United States Patent [19]
Feuerbacher et al.

[11] 3,797,574
[45] Mar. 19, 1974

[54] MISCIBLE OIL RECOVERY PROCESS

[75] Inventors: David G. Feuerbacher, Bellaire; Mary K. H. Smith, Houston, both of Tex.

[73] Assignee: Texaco Inc., New York, N.Y.

[22] Filed: Oct. 27, 1972

[21] Appl. No.: 301,542

[52] U.S. Cl............... 166/274, 166/275, 166/305 R
[51] Int. Cl.............................................. E21b 43/16
[58] Field of Search........ 166/273, 274, 275, 305 R; 252/8.55 D

[56] References Cited
UNITED STATES PATENTS

| | | | |
|---|---|---|---|
| 2,692,231 | 10/1954 | Stayner et al. | 166/275 |
| 2,761,843 | 9/1956 | Brown | 252/8.55 D |
| 3,258,070 | 6/1966 | Reusser | 252/8.55 D |
| 3,369,602 | 2/1968 | Fallgatter et al. | 166/273 |
| 3,414,054 | 12/1968 | Bernard | 166/273 |
| 3,431,265 | 3/1969 | Wakeman et al. | 252/8.55 D |
| 3,437,141 | 4/1969 | Brander et al. | 166/273 |
| 3,469,630 | 9/1969 | Hurd et al. | 166/273 |
| 3,478,823 | 11/1969 | Murphy | 166/274 |
| 3,498,379 | 3/1970 | Murphy | 166/273 |
| 3,632,330 | 1/1972 | Michaelson | 252/8.55 D |

OTHER PUBLICATIONS

"The Condensed Chemical Dictionary", 1971, Eighth Edition, p. 747.

Primary Examiner—Ernest R. Purser
Assistant Examiner—Jack E. Ebel
Attorney, Agent, or Firm—T. H. Whaley; C. G. Ries

[57] ABSTRACT

A process for recovering petroleum from a subterranean petroleum containing formation by flooding with a surfactant wherein the adsorption of surfactant by the formation rock is inhibited by treating the formation with a preflush slug of a water soluble quaternary ammonium salt such as tetramethylammonium chloride prior to injecting the surfactant. Preferably, treatment is accomplished by injecting an aqueous solution of water soluble quaternary ammonium salt into the formation in an amount sufficient to satisfy substantially all of the adsorption capacity of the formation matrix followed by injection of an aqueous solution of the surfactant into the formation. The quaternary ammonium salt and the surfactant solution can be subsequently displaced through the formation by any convenient aqueous drive fluid including water.

11 Claims, No Drawings

MISCIBLE OIL RECOVERY PROCESS

BACKGROUND OF THE INVENTION

1. Field of the Invention

This invention relates to the recovery of petroleum from a subterranean formation. More particularly, this invention relates to the recovery of petroleum from a subterranean formation by flooding the formation with water. Still more particularly this invention concerns to a method of recovering petroleum by injecting an aqueous solution of surfactant into the formation.

2. Prior Art

Petroleum is frequently recovered from subterranean formations or reservoirs in which it has accumulated by pumping or permitting the petroleum to flow to the surface through wells drilled into the subterranean formations. This process is referred to as primary recovery. A large amount of oil, generally in the range of 65% to 90% or more, is left in the subterranean formation at the conclusion of the primary recovery program. At the conclusion of the primary production recovery program, it is common practice to resort to some form of supplemental recovery technique in order to recover additional amounts of petroleum from the subterranean formation. These supplemental operations are frequently referred to as secondary recovery operations, although in fact they may be primary, secondary or tertiary in sequence of their employment.

The most widely used supplemental recovery operation involves the injection of an extraneous fluid such as water through injection wells drilled into the subterranean formation, so that the injected fluid displaces oil through the formation to be produced from production wells.

While water flooding is a useful supplemental recovery technique, water has a relatively poor displacement efficiency. This is largely due to the fact that water and oil are immiscible at reservoir conditions, and the interfacial tension between water and oil is quite large. For this reason, a large portion of the oil is left unrecovered in the formation at the conclusion of a conventional waterflood.

It has been recognized by those skilled in the art of supplemental recovery techniques, that the inclusion of a surface active agent or surfactant in the flood water would reduce the interfacial tension between the flood water and the formation petroleum, thereby promoting displacement of the residual oil by water more efficiently than is possible by using water alone. For example, U.S. Pat. No. 3,468,377 discloses the use of petroleum sulfonates in waterflood operations, and U.S. Pat. No. 3,553,130 discloses the use of ethylene oxide adducts of alkyl phenols for the same purpose. U.S. Pat. No. 2,233,381 teaches the use in water flooding operations of a water soluble, surface active, alkaline earth resistant polyglycol ether such as iso-octylphenyl polyglycol ether. Field operations employing surface-active agents or surfactants in the injected flood water have not always been entirely satisfactory. One reason for this is the fact that surfactants are adsorbed by the formation rock to a relatively high degree, resulting in a continually declining concentration of surfactant in the flood water with distance from the injection point. In order to maintain a sufficient concentration of the surfactant at the oil/water interface, it has been necessary to use a very large concentration of surfactant in the flood water. Since waterflood operations typically involve enormous quantities of injected fluid, running into the hundreds of millions of gallons of flood water, the use of surfactants in sufficiently high concentrations to overcome this adsorption problem imposes a severe adverse economic burden on the process.

Another serious problem in any supplemental recovery operation in which an extraneous fluid such as water is injected into a subterranean petroleum containing formation to displace the petroleum or oil to the production means, is premature breakthrough of the injected fluid. Premature breakthrough is the breaking through of the injected or driving fluid at the production means before an adequate portion of the formation has been swept. This problem is frequently described in terms of sweep efficiency, to distinguish from the displacement efficiency described above. Displacement efficiency involves the microscopic, pore-by-pore efficiency by which water displaces oil, whereas sweep efficiency is related to the gross portions of the reservoir which are swept and unswept by the injected fluid. A major cause of poor sweep efficiency is associated with the fact that the injected fluid generally has a lower viscosity than the displaced fluid or petroleum. The greater the difference in viscosity of injected fluid and the viscosity of petroleum, the more pronounced will be the tendency toward premature breakthrough of the injected fluid.

Polymeric organic compounds which have the effect of increasing the viscosity of the injected fluid, thereby increasing the sweep efficiency of the supplemental recovery program, have been used in recent years. For example, U.S. Pat. No. 3,039,529 and U.S. Pat. No. 3,282,337 teach the use of aqueous polyacrylamide solutions to increase the viscosity of the injected fluid, thereby promoting increased sweep efficiency. U.S. Pat. No. 3,581,824 teaches the use of polysaccharides for the same purpose. Polymers which are useful for increasing the viscosity of the injected fluid are effective but usually expensive. Since substantial quantities of these polymers are required, the economics of such supplemental recovery programs are frequently a deterrent to their more widespread use. It is known that the commonly used viscosity increasing polymers adsorb on the formation rock, and this adsorption loss tends to decrease the efficiency of the material and increase the cost of any such program.

The above-described problems have been recognized by those skilled in the art of oil recovery. The use of certain compounds as sacrificial chemicals to pretreat the formation in order to decrease the adsorption of subsequently injected surfactant is known. For example, U.S. Pat. No. 3,414,054 discloses the use of aqueous solutions of pyridine, U.S. Pat. No. 3,469,630 discloses the use of sodium carbonate and inorganic polyphosphates, and U.S. Pat. No. 3,437,141 discloses the use of soluble carbonates, inorganic polyphosphates and sodium borate in combination with a saline solution of a surfactant having both a high and a low molecular weight component followed by a saline solution of the low molecular weight component of the surfactant. These materials have not always been completely satisfactory from a standpoint of performance and economics.

SUMMARY OF THE INVENTION

The invention provides a method for recovering petroleum from petroleum-containing subterranean formations having injection means and producing means completed therein, comprising first injecting through the injection means into the subterranean formation, a sacrificial material comprising a water soluble quaternary ammonium salt such as tetramethylammonium chloride in sufficient quantity to be adsorbed on the formation rock and to occupy substantially all of the adsorption sites of the rock contained in the subterranean formation, followed by injecting a surfactant solution through the injection means into the subterranean formation and thereafter injecting through the injection means into the subterranean formation of drive fluid, which is commonly water, whereby the oil is displaced through the subterranean formations to the surface of the earth through the production means.

DESCRIPTION OF THE SPECIFIC EMBODIMENTS

In carrying out this invention, a relatively small quantity of a fluid, or a slug as it is commonly referred to by those skilled in the art of supplemental oil recovery techniques, is injected into the subterranean petroleum containing formation as a preflush treating composition. The fluid preflush treating composition, or preflush slug, contains a water soluble quaternary ammonium salt such as tetramethylammonium chloride, which serves as a sacrificial treating material to be adsorbed by the formation matrix or rock, thereby occupying or covering substantially all adsorption sites within the subterranean formation. The presence of this preflush composition material adsorbed on the formation rock prevents or reduces the adsorption of more expensive surfactant from surfactant solution injected after the injection of the fluid preflush composition.

The most important characteristics for a satisfactory sacrificial preflush material are:

1. that it be less expensive than the surfactant,
2. that it be adsorbed readily by the subterranean formation matrix, and
3. that the presence of such adsorbed sacrificial material retards or eliminates the subsequent adsorption of surfactant on the adsorption sites of the formation rock.

By adsorption sites of the formation rock is meant those parts of the surfaces of the pores of the formation rock capable of adsorbing a chemical compound from a solution on contact.

The sacrificial materials described herein do not themselves have any appreciable effect on the recovery efficiency of water flooding operations. Additional oil can be recovered only if injection of the sacrificial material is followed by injection of a surfactant solution which will effectively increase the amount of oil which is displaced from the subterranean formation pores. Ordinarily, flooding water is injected through conventional injection means and into the subterranean formation behind the surfactant solution to displace the oil and surfactant toward the production means, and then to the surface of the earth.

The surfactant for use in such a supplemental recovery program should be injected into the subterranean formation ahead of the flood water, thereby achieving the desired low interfacial tension between the flood water and the displaced fluid. The surfactant may be present in a hydrocarbon solvent or in an aqueous solution, or in a combination thereof. Any type of surfactant, anionic, cationic or nonionic, may be used in the practice of this invention, although we have found nonionic surfactants such as ethoxylated substituted phenols or anionic surfactants such as petroleum sulfonates to be especially preferable.

The amount of surfactant which must be employed in the practice of this invention will ordinarily vary with various reservoir parameters, but generally will range from 0.01 to 0.1 pore volumes of an aqueous surfactant solution having dissolved therein from 0.001 to 0.5 percent by weight of the surfactant. A small amount of the sacrificial material used in the preflush may also be added to the surfactant solution to aid further in preventing the adsorption of the surfactant by the formation rock. Sodium chloride may also be added to the surfactant solution for the same purpose. The surfactant used in the experimental work described later in this specification is a 9.5 mole ethylene oxide adduct of nonyl phenol, an anionic surfactant, available commercially under the trade name Surfonic N-95, a product of Jefferson Chemical Company.

In carrying out this invention, a sacrificial material is injected via suitable injection means, i.e., through one or more injection wells completed in the subterranean hydrocarbon formation, so that the sacrificial material enters the formation ahead of the surfactant. The surfactant is then injected into the subterranean hydrocarbon containing formation, followed by the injection of water. By injecting the sacrificial material in this particular sequence, the sacrificial material adsorbs on and occupies the sites existing in the matrix of the formation, thereby eliminating or substantially decreasing the tendency for the subsequently injected surfactant to adsorb on the formation matrix surface. As mentioned above, the surfactant may also contain a small amount of the sacrificial material.

Both the sacrificial material and the surfactant may be injected into the subterranean hydrocarbon containing formation in an aqueous solution or in a nonaqueous solution such as hydrocarbon solvent, depending on availability and other requirements. Economic considerations, however, often require that the materials be injected in aqueous solutions whenever possible.

The quantity of sacrificial material to be injected into the subterranean hydrocarbon containing formation in advance of the surfactant solution should be sufficient to occupy substantially all of the active sites of the formation matrix, in order to effect the maximum reduction in the amount of surfactant that would otherwise adsorb onto the surfaces of the formation. If less than this optimum amount is used, however, there will be a corresponding reduction in the adsorption of surfactant from the injected solution onto the formation matrix, although the amount of reduction will not be as great as in the case where the formation is completely saturated with sacrificial material. Similarly, if more than the amount of sacrificial material necessary to occupy all of the active sites on the formation matrix is injected into the subterranean hydrocarbon containing formation, no reduction in oil displacement efficiency will result. The only detriment resulting from using excess sacrificial material would be an increase in the cost of operating the supplemental oil recovery program.

Ordinarily the preferred range of sacrificial material will vary with the thickness of the formation, the area of pattern to be swept, and to a degree by other formation characteristics. It is convenient to express the quantity of sacrificial material in terms of pounds of material per acre foot of formation of the particular pattern which the injected fluid is expected to sweep. Ordinarily, from about 50 to about 500 pounds per acre foot of formation of the sacrificial material described in this specification is sufficient to prevent adsorption of surfactant from injected surfactant solution.

We have found that quaternary ammonium salts having the following structure are especially effective sacrificial materials for use as a preflush to prevent adsorption of surfactant by the formation:

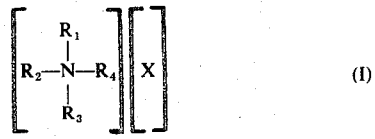

$$\left[\begin{array}{c} R_1 \\ | \\ R_2-N-R_4 \\ | \\ R_3 \end{array}\right] [X] \quad (I)$$

wherein $R_1$, $R_2$, $R_3$, and $R_4$ are independently selected from the group consisting of alkyl radicals having from one to four inclusive carbon atoms, and X is selected from the group consisting of chloride, fluoride, bromide and hydroxyl radicals. If $R_1$, $R_2$, $R_3$, and $R_4$ are each methyl and X is chlorine, the compound is tetramethylammonium chloride. The sacrificial material is most conveniently injected in the form of an aqueous solution, and we have found that approximately 1% by weight of solution of tetramethylammonium chloride is an optimum concentration to use. The concentration may be varied, however, since it is the total amount of sacrificial material which is injected that determines the effectiveness in preventing the adsorption of the subsequently injected surfactant. In the instance of using a 1% by weight solution of tetramethylammonium chloride, from about 1 to about 4 pore volumes of solution should be injected into the formation prior to the injection of surfactant. Since the adsorptivity of reservoirs varies considerably depending on the type of formation and the type and amount of clays that may be present in the formation, some knowledge of the formation may be necessary in order to determine the optimum amount of quaternary ammonium salt to inject in order to achieve the maximum reduction in the amount of surfactant which will be subsequently adsorbed on the formation. If the subterranean petroleum containing formation matrix is a relatively clean, i.e., nonclay containing, sand or sandstone, the lower limits of the range given above may be used, whereas formations containing relatively larger amounts of clay may require substantially greater quantities of the sacrificial inorganic additive to achieve the desired benefits.

The surfactant may be injected immediately following the injection of the aqueous preflush slug of quaternary ammonium salt or it may be desirable in the instance of using particular surfactants to separate the preflush slug from the surfactant slug by the injection of an isolation slug of inert fluid such as fresh or salt water. It is usually most convenient to inject an aqueous solution of surfactant, and it may be desirable to include the soluble quaternary ammonium salt in the surfactant solution, in a concentration approximately equal to the concentration of the originally injected preflush slug. Injection of the surfactant solution may be continued as long as is desired, although economics generally dictate that such injection be terminated and that a more economical fluid such as water be injected thereafter to displace the surfactant slug and oil through the reservoir.

Treating the subterranean petroleum containing reservoir with a preflush slug comprising an aqueous solution of a water soluble quaternary ammonium salt is especially effective in reducing adsorption of nonionic surfactants. Accordingly, an especially preferred embodiment of this invention involves injecting an aqueous preflush slug of tetramethylammonium chloride followed by the injection of an aqueous solution of a nonionic surfactant such as that previously described into the said formation, followed by injecting water.

While this invention has been described primarily as an improved method of conducting of surfactant-water flooding oil recovery program, it should be recognized that the same sacrificial material is highly effective for inhibiting the adsorption of polymeric materials incorporated into the injection fluid for the purpose of increasing the viscosity of said fluid. For example, the aqueous solution of tetramethylammonium chloride may be used to pretreat a formation, followed by the injection of an aqueous solution of viscosity increasing polymer such as polyacrylamide. Since the pretreatment with the tetramethylammonium chloride inhibits the adsorption of polyacrylamide from solution, the viscosity of the injected polyacrylamide water mixture will remain more constant throughout the displacement process. The total effectiveness of the viscous flood will be improved by use of the tetramethylammonium chloride preflush.

The effectiveness of this invention for reducing the adsorption of surfactant on formation rock in surfactant water flooding operations is demonstrated by the following examples, which are presented by way of illustration and are not intended as limiting the spirit and scope of the invention as are defined hereinafter in the claims.

In order to test the adsorption of the previously described nonionic surfactant on sand, a column was filled with sieved 150–200 mesh silica sand which had been thoroughly washed to remove all fines. A weighed quantity of this sand was added to the column and the pore volume of the column was determined. If a quaternary ammonium salt preflush solution was to be tested to determine the extent that it could decrease the adsorption of the surfactant, 100 ml. of a known concentration of this preflush material was passed through the column and followed by 25 milliliters of a known concentration of the surfactant. Distilled water was passed through the column and samples of the effluent from the column were taken at intervals. Concentration of the surfactant in the effluent was measured by spectrophotometry. In Table I, data are given indicating the extent of adsorption of the surfactant on the sand when no preflush was used in Run 1 and when the sand was pretreated with an aqueous solution of 1 percent by weight tetramethylammonium chloride in Run 2. Column II gives the pore volumes of water which were flowed through the sand to elute 60% of the surfactant. Column III gives the pore volumes of water which were passed through the column to elute 90% of the surfactant. Column IV gives the pore volumes of water which were passed through the column in order to elute 90% of the surfactant after the surfactant first appeared in the effluent. Those instances in which a larger quantity of the surfactant were adsorbed on the sand are indicated by the necessity of passing greater quantities of water through the sand in order to elute a given amount of the surfactant.

Line 3 of Table I gives values calculated as the theoretical potential value, based on surfactant spreading and assuming that no adsorption occurred on a column of sand identical to that used in the experiment. Line 4 of Table I gives the results obtained on an identical column of sand using a sample of potassium permanganate on a column which had been deactivated by saturating with potassium permanganate to eliminate spreading due to adsorption. Runs 33 and 4 represent the best possible results which would be obtained by using any preflush treatment. It can be seen from these data that a preflush slug of an aqueous solution of tetramethylammonium chloride is extremely effective at reducing the adsorption of surfactant on the sand particle surfaces.

2. The method of claim 1 wherein said fluid preflush composition is injected in at least an amount sufficient to satisfy substantially all of the adsorption capacity of the formation rock.

3. The method of claim 1 wherein the quaternary ammonium salt has the following structure:

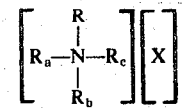

wherein R, $R_a$, $R_b$, and $R_c$ are independently selected from the group consisting of alkyl radicals having from one to four inclusive carbon atoms and X is selected from the group consisting of hydroxyl, chlorine, fluorine, and bromine radicals.

TABLE I.—ADSORPTION DATA
(Surfactant on sand)

| I Preflush | II Pore volumes of water required to elute 60 percent of surfactant | III Pore volumes of water required to elute 90 percent of the surfactant | IV Pore volumes of water required to elute 90 percent of surfactant after first appearance of surfactant |
|---|---|---|---|
| 1. None | 4.90 | 8.43 | 6.93 |
| 2. Tetramethylammonium chloride | 2.05 | 2.96 | 2.10 |
| 3. Theoretical | 1.36 | 1.67 | 0.96 |
| 4. 26 parts per million potassium permanganate | 1.42 | 1.75 | .97 |

Thus it can be seen that by injecting into a subterranean formation a small quantity of aqueous preflush slug of a water soluble quaternary ammonium salt such as tetramethylammonium chloride, the amount of subsequently injected surfactant which is adsorbed onto the formation can be dramatically decreased. Since less surfactant is required supplemental recovery techniques can be performed with improved economics. By preventing the adsorption of surfactant onto the formation surfaces, the concentration of surfactant may be maintained relatively constant throughout the progress of the supplemental recovery technique, which results in an improvement in oil recovery efficiency.

Various embodiments and modifications of this invention are apparent from the foregoing description and examples, and further modifications will be apparent to those skilled in the art. These modifications are included within the scope of this invention as defined by the claims below.

We claim:

1. In a method of recovering petroleum from a subterranean petroleum containing formation wherein an aqueous flooding medium containing a surfactant adsorbable by the formation rock is injected through injection means and petroleum is recovered from production means, the improvement which comprises injecting a fluid preflush composition containing a water soluble quaternary ammonium salt into said formation prior to the injection of said surfactant.

4. The method of claim 3 wherein the quaternary ammonium salt is tetramethylammonium chloride.

5. The method of claim 1 wherein the fluid preflush composition comprises an aqueous solution of from about 0.5 to about 2 percent by weight of tetramethylammonium chloride.

6. The method of claim 5 wherein from about 1 to about 4 pore volumes of the aqueous tetramethylammonium chloride solution is injected into the formation.

7. The method of claim 5 wherein from about 50 to about 500 pounds per acre foot of tetramethylammonium chloride per acre foot of formation to be swept are injected into the formation.

8. The method of claim 1 wherein the fluid preflush composition also contains sodium chloride.

9. The method of claim 1 wherein the surfactant is in an aqueous solution which also contains sodium chloride.

10. The method of claim 1 wherein the surfactant is in an aqueous solution which also contains the water soluble quaternary ammonium salt used in the fluid preflush composition.

11. The method of claim 1 wherein the aqueous flooding medium containing a surfactant also contains tetramethylammonium chloride.

* * * * *